(No Model.)
C. G. P. DE LAVAL.
ROTATING SHAFT.
No. 553,811. Patented Jan. 28, 1896.
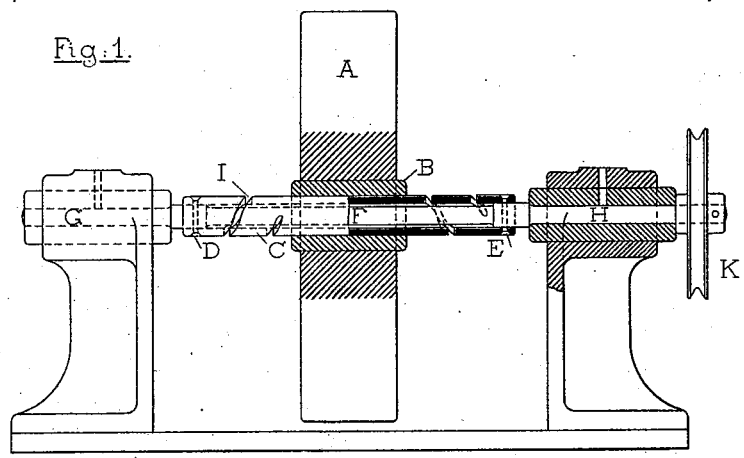
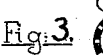
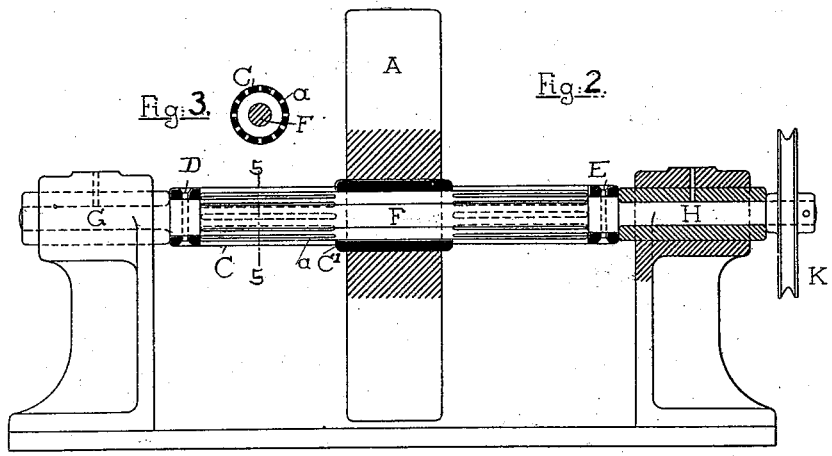
WITNESSES:
Juan C. Abel
Geo. S. Wheelock
INVENTOR:
Carl G. P. de Laval
BY Jorpel & Raegener
ATTORNEYS.

UNITED STATES PATENT OFFICE.

CARL GUSTAF PATRIK DE LAVAL, OF STOCKHOLM, SWEDEN.

ROTATING SHAFT.

SPECIFICATION forming part of Letters Patent No. 553,811, dated January 28, 1896.

Application filed January 7, 1892. Serial No. 417,271. (No model.)

*To all whom it may concern:*

Be it known that I, CARL GUSTAF PATRIK DE LAVAL, a citizen of Sweden, residing at Stockholm, Sweden, have invented certain new and useful Improvements in Rotating Shafts; and I do declare the following to be a full, clear, and exact description of the invention, such as will enable others skilled in the art to which it appertains to make and use the same.

This invention refers to an improvement in those rotating shafts carrying a rotating body which adjust themselves toward and from the axial line of their bearings while in rotation until the body assumes the position in which it runs steady.

The invention consists in a rapidly-rotating body and its shaft, together with a tube which surrounds the shaft and carries the rotating body, which tube is flexible or yielding, so as to render the rotating body self-adjusting and self-balancing.

To make the invention intelligible, I have shown an example in the accompanying drawings—viz., the fixing of the rotating body on a tube which is fixed on and around a shaft, and which tube is made elastic, yielding, or springing in some way, so that the rotating body by the bending of this tube is rendered self-adjusting or self-balancing.

In the accompanying drawings, Figure 1 shows a longitudinal section, partly in elevation, of the preferred form of my invention. Fig. 2 is a section similar to Fig. 1 of another form of my invention, and Fig. 3 is a section thereof on line 5 5.

Similar letters of reference indicate corresponding parts.

In Fig. 1 the body A is fixed on the bush B, which again is made fast upon the central part of the tube C, the latter being fastened at both ends D and E to the shaft F. This shaft is supported at each end in bearings G and H in the usual way, and the motion is imparted to the rotating parts by means of a driving-pulley K. A portion of the shaft F between D and E is reduced or turned down, thus leaving an annular space between the tube C and the shaft F. A helical slit I is cut in the tube C between its central portion and each end, so that the central portion occupied by the body A may, while revolving, by the springing of the tube adjust itself toward and from the axial line of the bearings and assume such a position relative to shaft E as may be required to secure an even rotation, so as to save the bearings.

In Figs. 2 and 3 the tube being somewhat thicker is provided with longitudinal slits $a$, by means of which the required elasticity is obtained.

In like manner other constructions for suspending the body A elastically on the shaft F may be employed without departing from the scope of this invention.

The bearings G and H for the ends of the shaft have in the present case been shown fixed. In some instances, however, it may be desirable that these also can yield a little to a certain extent. In such cases Seller's bearings, pivoted bearings, or bearings surrounded by india-rubber rings, like the top bearing of my cream-separators, should be used. Other constructions of self-adjusting bearings may also be used to give the requisite adjustment.

Having thus described my invention, I claim as new and desire to secure by Letters Patent—

1. The combination, with a rapidly-rotating body and its shaft, of a tube surrounding the shaft and carrying the rotating body, said tube being flexible or yielding so as to render the rotating body self-adjusting and self-balancing, substantially as set forth.

2. The combination, with a rapidly-rotating body and its shaft, of a tube surrounding the shaft and carrying the rotating body, said tube being provided with suitable slits, which make the rotating body self-adjusting and self-balancing, substantially as set forth.

3. The combination, with a rapidly-rotating body and its shaft, of a tube surrounding the shaft and carrying the rotating body, said tube being provided with a helical slit between its central portion and each end, which slit makes the rotating body self-adjusting and self-balancing, substantially as set forth.

In testimony whereof I affix my signature in presence of two witnesses.

CARL GUSTAF PATRIK DE LAVAL.

Witnesses:
N. S. VON BÖK,
WALDEMAR BOMAN.